(12) United States Patent
Tanaka (10) Patent No.: US 9,363,737 B2
(45) Date of Patent: Jun. 7, 2016

(54) COMMUNICATION SYSTEM, BASE STATION, TERMINAL DEVICE, AND COMMUNICATION METHOD

(71) Applicant: FUJITSU LIMITED, Kawasaki-shi, Kanagawa (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/919,229

(22) Filed: Oct. 21, 2015

(65) Prior Publication Data

US 2016/0044579 A1 Feb. 11, 2016

Related U.S. Application Data (63) Continuation of application No. PCT/JP2013/063083, filed on May 9, 2013.

(51) Int. Cl.
| | |
|---|---|
| H04W 4/00 | (2009.01) |
| H04W 48/12 | (2009.01) |
| H04W 72/04 | (2009.01) |
| H04W 4/02 | (2009.01) |

(52) U.S. Cl.
CPC .............. *H04W 48/12* (2013.01); *H04W 4/005* (2013.01); *H04W 4/021* (2013.01); *H04W 72/0406* (2013.01); *H04W 4/02* (2013.01)

(58) Field of Classification Search
CPC ..... H04W 48/12; H04W 4/021; H04W 4/005; H04W 4/02; H04W 72/0406
USPC ................ 455/420–422.1, 435.2–453, 456.1; 370/228–332, 338
See application file for complete search history.

(56) References Cited

U.S. PATENT DOCUMENTS

| | | | |
|---|---|---|---|
| 2011/0189998 A1* | 8/2011 | Joo .................. | H04W 24/00 455/444 |
| 2012/0178454 A1 | 7/2012 | Kim et al. | |

OTHER PUBLICATIONS

3GPP TR 23.887 V0.8.0, "3rd Generation Partnership Project; Technical Specification Group Services and System Aspects; Machine-Type and other Mobile Data Application Communications Enhancements (Release 12)", Feb. 2012.
ZTE, "Classification of Small Data Transmission Solutions", Agenda Item: 8.2.1, 3GPP SA WG2 Meeting #95, S2-130224, Prague, Czech Republic, Jan. 28-Feb. 1, 2013.
3GPP, Standardization of Machine-type Communications V0.1.9, Mar. 2013.
International Search Report issued for corresponding International Patent Application No. PCT/JP2013/063083, mailed Jun. 18, 2013, with an English translation.

(Continued)

*Primary Examiner* — Babar Sarwar
(74) *Attorney, Agent, or Firm* — Myers Wolin, LLC (57) ABSTRACT

A communication system includes a first cell, a plurality of second cells, a first base station that manages the first cell, and a terminal device that is present in the first cell, wherein the first base station transmits notification information indicative of a specific cell in which short-procedure communication is capable of being performed out of the second cells to the terminal device, and the terminal device performs a cell search targeting the specific cell out of the second cells in accordance with the notification information.

9 Claims, 5 Drawing Sheets

(56) References Cited

OTHER PUBLICATIONS

The Extended European search report with the supplementary European search report and the European search opinion issued for corresponding European Patent Application No. 13884127.5 mailed on Apr. 11, 2016.

Fujitsu, "RAN impact of SA2 solutions for Small Data Transmission enhancement", Agenda Item: 5.2.1, 3GPP TSG-RAN WG2 Meeting #81bis, R2-131049, Chicago, IL (US), Apr. 15-19, 2013.

* cited by examiner

COMMUNICATION SYSTEM, BASE STATION, TERMINAL DEVICE, AND COMMUNICATION METHOD

CROSS-REFERENCE TO RELATED APPLICATION

This application is a continuation of International Application No. PCT/JP2013/063083, filed on May 9, 2013, the entire contents of which are incorporated herein by reference.

FIELD

The embodiments discussed herein are related to a communication system, a base station, a terminal device, and a communication method.

BACKGROUND

In recent years, in a communication system including a base station apparatus (hereinafter may be referred to as "base station") and a terminal device (hereinafter may be referred to as "terminal"), a machine type communication (MTC) terminal has been attracting attention as a new terminal. As one example of the MTC terminal, included are a smart meter that is an electric power meter provided with a wireless communication function, a vending machine provided with a wireless communication function, and a sensor provided with a wireless communication function. The smart meter provided with a wireless communication function transmits data of measured power consumption and others to a base station, for example. The vending machine provided with a wireless communication function transmits sales information, information on inventory in the vending machine, and others to the base station, for example. As the sensor provided with a wireless communication function, included is a global positioning system (GPS) sensor provided with a wireless communication function, and this GPS sensor transmits information on the current position of a user to the base station.

Because the MTC terminal transmits specific data (information) as in the foregoing, as compared with general terminals (smart phones, for example) that transmit and receive various types of data, the type of data and the amount of data desired as objects of communication are small. That is, in the MTC terminal, there are a relatively large number of cases in which "user data in small size" (hereinafter may be referred to as "small data") such as measurement data is intermittently transmitted.

When the MTC terminal that is in an idle mode (standby condition) performs transmission of small data, numerous control messages are exchanged with a base station to set up a communication channel with the base station (that is, to move into a connection mode). Because the amount of data in small data is small, if numerous control messages are exchanged when setting up the communication channel for the small data, the overhead of control message increases and it is undesirable in terms of utilization efficiency of communication resources.

Consequently, in the 3rd generation partnership project (3GPP), the following conventional technologies have been studied in order for the MTC terminal in an idle mode to perform the transmission of small data with the exchange of a less number of control messages.

As the first conventional technology, there is one that adds the small data to a message 3 (for example, an RRC connection request) in a random access procedure executed by using a signaling radio bearer (SRB) that is a communication channel for control messages (that is, a communication channel in control plane). The random access procedure using the SRB is executed before a data radio bearer (DRB) that is a communication channel for exclusive use of user data (that is, a communication channel in user plane) is set up.

As the second conventional technology, there is one that keeps holding the DRB that has been set up already without releasing it even when the MTC terminal is in an idle mode.

According to the first and second conventional technologies, because it is not necessary to newly set up a DRB even when small data is generated, at the time of transmitting the small data, the exchange of control messages needed for setting up the DRB can be omitted. Consequently, the amount of control messages at the time of transmitting small data can be reduced. Moreover, due to the reduction in the amount of control messages, the power consumption of the MTC terminal is also reduced.

In the following description, as in the first and second conventional technologies, "communication of transmitting or receiving user data without newly setting up a DRB at the time the user data is generated" is referred to as "short-procedure communication." The setting up of a DRB is performed in response to a service request transmitted from a terminal to a base station, that is, a setting request for DRB. Consequently, the "short-procedure communication" can also be referred to as "communication of transmitting or receiving user data without a setting request for DRB."

Furthermore, in the 3GPP, studied has been a technology to utilize "small cell" other than "macro cell." The "cell" is defined based on "communication area" and "channel frequency" of a single base station. The "communication area" may be a whole of the area in which a radio wave transmitted from the base station reaches (hereinafter may be referred to as "range area") or may be a divided area that is the divided range area (what is called a sector). The "channel frequency" is one unit of frequency that the base station uses in communication, and is defined based on a center frequency and a bandwidth. The "macro cell" is a cell managed by a base station capable of transmitting at high transmission power, that is, a base station having a large range area (hereinafter may be referred to as "macro-cell base station"). The "small cell" is a cell managed by a base station that transmits at low transmission power, that is, a base station having a range area smaller than that of the macro-cell base station (hereinafter may be referred to as "small-cell base station"). That is, as a cell configuration of communication system, the one in which the cells of different sizes are mixed has been studied. For example, as the cell configuration, there can be a configuration in which a plurality of small cells are included within a macro cell (first cell configuration), or a configuration in which a plurality of small cells are arranged regardless of a macro cell (second cell configuration).

Related-art examples are described, for example, in 3GPP TR23.887 V0.8.0.

A terminal present in a small cell is closer in distance to a base station than a terminal present in a macro cell, and thus it can transmit data at transmission power lower than that of the terminal present in the macro cell. Consequently, a terminal can reduce power consumption by transmitting data to a small-cell base station more than by transmitting the data to a macro-cell base station.

Thus, it is conceivable to reduce the power consumption of an MTC terminal by transmitting small data to a small-cell base station only when the MTC terminal is present in a small cell. Moreover, it is conceivable that the MTC terminal that is present in the small cell transmits the small data to the small-cell base station by using short-procedure communication to further reduce the power consumption of the MTC terminal.

However, to date, there has been no technology that efficiently performs short-procedure communication in a cell configuration in which cells of different sizes are mixed.

SUMMARY

According to an aspect of an embodiment, a communication system includes a first cell, a plurality of second cells, a first base station that manages the first cell, and a terminal device that is present in the first cell, wherein the first base station transmits notification information indicative of a specific cell in which short-procedure communication is capable of being performed out of the second cells to the terminal device, and the terminal device performs a cell search targeting the specific cell out of the second cells in accordance with the notification information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

With reference to the accompanying drawings, the following describes exemplary embodiments of a communication system, a base station, a terminal, and a communication method disclosed in the present application. The embodiments discussed herein, however, are not intended to limit the communication system, the base station, the terminal, and the communication method disclosed in the application. In the respective embodiments, for those constituent elements having the same function and those steps at which the same processing is performed, the same reference signs are given and the redundant explanations thereof are omitted. In the following description, although the communication system is exemplified in the cases of a long term evolution (LTE) system and an LTE-Advanced (LTE-A) system in the 3GPP as one example, it is not limited to these.

First Embodiment

Outline of Communication System

Figure 1:
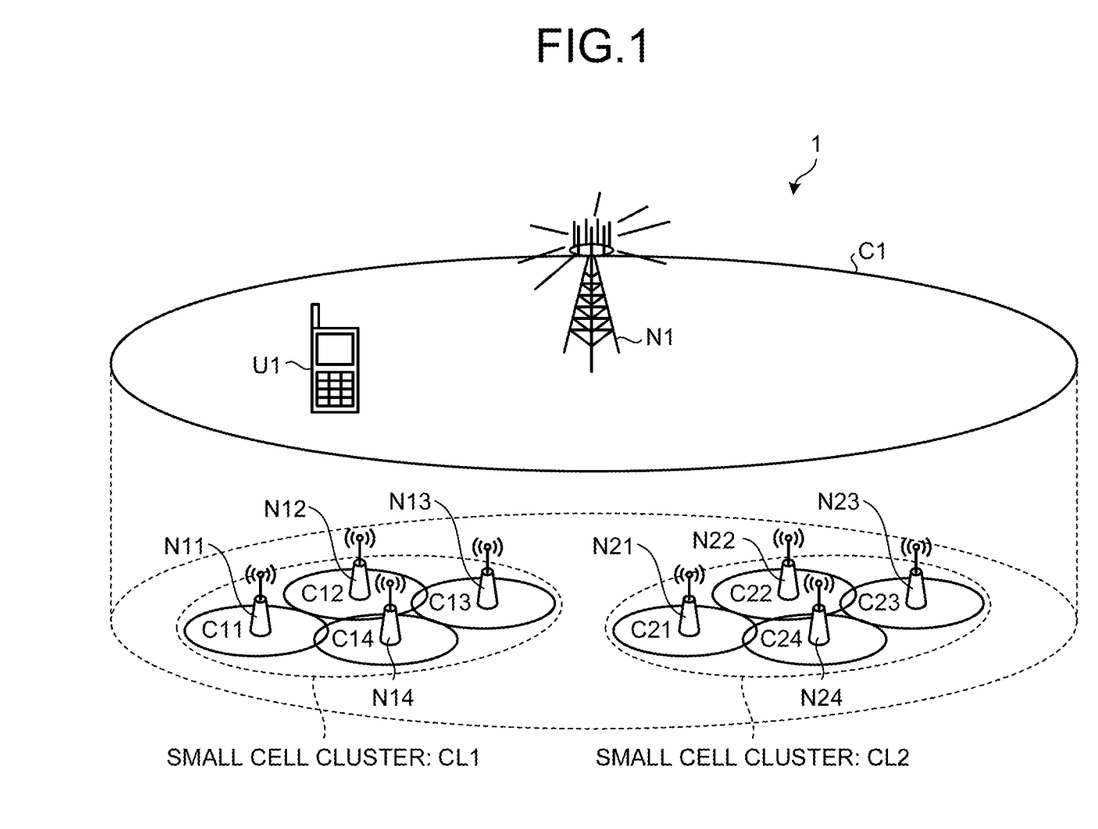
FIG. 1 is a diagram illustrating one example of a communication system according to a first embodiment.

FIG. 1 is a diagram illustrating one example of a communication system according to a first embodiment. In FIG. 1, a communication system 1 includes a macro-cell base station N1, small-cell base stations N11 to N14 and N21 to N24, and a terminal U1. The terminal U1 is an MTC terminal, and thus the data that the terminal U1 transmits is small data.

The macro-cell base station N1 manages a macro cell C1. The small-cell base stations N11 to N14 manage small cells C11 to C14, respectively, and the small-cell base stations N21 to N24 manage small cells C21 to C24, respectively. The small cells C11 to C14 constitute a small cell cluster CL1, and the small cells C21 to C24 constitute a small cell cluster CL2. The small cell cluster CL1 and the small cell cluster CL2 overlap the macro cell C1 with each other. That is, the communication system 1 illustrated in FIG. 1 assumes the above-described first cell configuration, that is, the configuration in which a plurality of small cells C11 to C14 and C21 to C24 are included within the macro cell C1. The technology disclosed in the following, however, is applicable to a communication system that assumes the above-described second cell configuration, that is, the configuration in which a plurality of small cells C11 to C14 and C21 to C24 are arranged regardless of the macro cell C1.

The terminal U1 here is present in the macro cell C1, and thus the macro cell C1 is a serving cell of the terminal U1 (the cell in which the terminal U1 is registered). Because the terminal U1 is located within the small cell cluster CL1, the terminal U1 can change the communication destination to any of the small cells C11 to C14, and can also perform communication with any of the small cells C11 to C14 simultaneously with the macro cell C1. The terminal U1 is, as the functionality of the terminal U1, a terminal capable of performing short-procedure communication. Meanwhile, in the small cells C11 to C14 and C21 to C24, as the functionality of the small-cell base stations N11 to N14 and N21 to N24, the cells in which short-procedure communication is capable of being performed and the cells in which short-procedure communication is not capable of being performed are present being mixed.

The macro-cell base station N1 transmits, to the terminal U1, notification information indicating which cells are the cells in which short-procedure communication is capable of being performed and which cells are the cells in which short-procedure communication is not capable of being performed, out of the small cells C11 to C14 and C21 to C24. That is, the macro-cell base station N1 transmits, to the terminal U1, the notification information (hereinafter may be referred to as "cell notification information") indicative of specific cells in which short-procedure communication is capable of being performed (hereinafter may be referred to as "short-procedure-communication performable cell") out of the small cells C11 to C14 and C21 to C24. For example, the cell notification information is formed by adding, to the cell identifier of the small cells C11 to C14 and C21 to C24, a sign of one bit that indicates whether it is a short-procedure-communication performable cell. For example, a bit with a value of "1" is added to the cell identifier of a short-procedure-communication performable cell while a bit with a value of "0" is added to the cell identifier of a cell not capable of performing short-procedure communication. The macro-cell base station N1 transmits such cell notification information to the terminal U1 as announcement information or as radio resource control (RRC) signaling.

The terminal U1 receives the cell notification information from the macro-cell base station N1. The terminal U1 performs a cell search targeting only the short-procedure-communication performable cells in accordance with the cell notification information. When the cell notification information is formed as in the foregoing manner, the terminal U1 performs the cell search targeting only the small cells corresponding to the cell identifiers to which a bit of "1" has been added out of a plurality of cell identifiers included in the cell notification information. The terminal U1 then transmits, by using short-procedure communication, small data to a small-cell base station that manages a small cell detected through the cell search (that is, a short-procedure-communication performable cell) out of the small cells C11 to C14 and C21 to C24.

For example, it is assumed that, out of the small cells C11 to C14 and C21 to C24, the small cells C12, C14, C22, and C24 are short-procedure-communication performable cells and the small cells C11, C13, C21, and C23 are cells not capable of performing short-procedure communication. In this case, in the cell notification information, a bit of "1" is added to the cell identifiers of the small cells C12, C14, C22, and C24, and a bit of "0" is added to the cell identifiers of the small cells C11, C13, C21, and C23. This cell notification information is stored in the macro-cell base station N1 in advance, and the macro-cell base station N1 transmits the cell notification information to the terminal U1. The terminal U1 that has received this cell notification information performs a cell search targeting only the small cells corresponding to the cell identifiers to which a bit of "1" has been added in the cell notification information, that is, the small cells C12, C14, C22, and C24. It is assumed that the terminal U1 is located within the small cell C14. Consequently, through the cell search, the terminal U1 detects the small cell C14 that is a short-procedure-communication performable cell. The terminal U1 then transmits, by using the short-procedure communication, small data to the small-cell base station N14 that manages the small cell C14.

Configuration Example of Base Station

Figure 2:
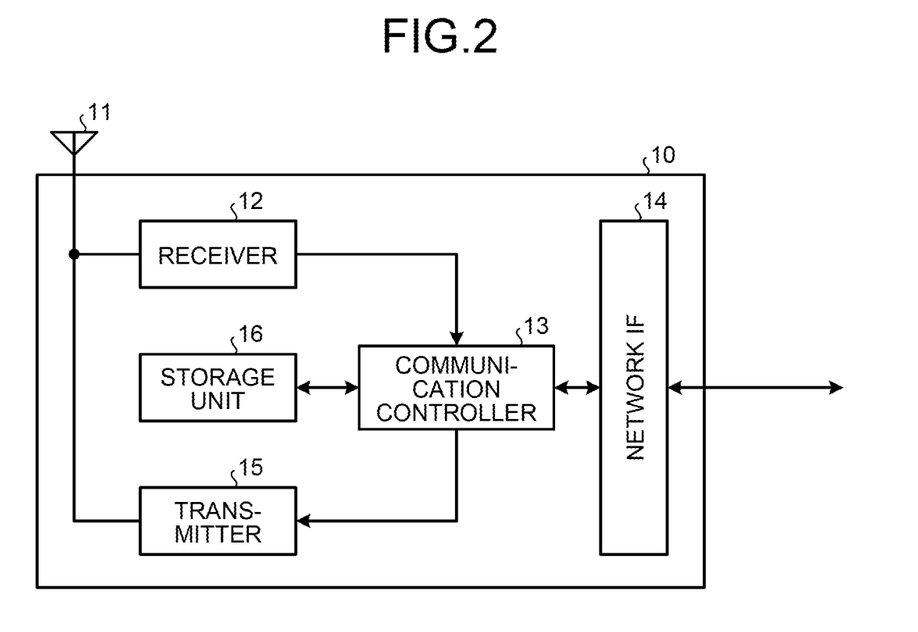
FIG. 2 is a block diagram illustrating one example of a base station in the first embodiment.

FIG. 2 is a block diagram illustrating one example of the base station in the first embodiment. In FIG. 2, a base station 10 includes an antenna 11, a receiver 12, a communication controller 13, a network interface (IF) 14, a transmitter 15, and a storage unit 16. The base station 10 is equivalent to the macro-cell base station N1 in FIG. 1.

The receiver 12 receives small data transmitted from the terminal U1 via the antenna 11 and outputs it to the communication controller 13.

In the storage unit 16, the cell notification information is stored.

The communication controller 13 outputs the small data received from the receiver 12 to the network IF 14. The communication controller 13 further acquires the cell notification information from the storage unit 16 and outputs it to the transmitter 15.

The network IF 14 is connected to a higher-level device such as a mobility management entity (MME) and a serving-gateway (S-GW), and transmits the small data received from the receiver 12 to the higher-level device. The network IF 14 further receives the cell notification information from the MME and outputs it to the communication controller 13. The communication controller 13 makes the storage unit 16 store therein the cell notification information received from the network IF 14.

The transmitter 15 transmits the cell notification information received from the communication controller 13 to the terminal U1 via the antenna 11.

Configuration Example of Terminal

Figure 3:
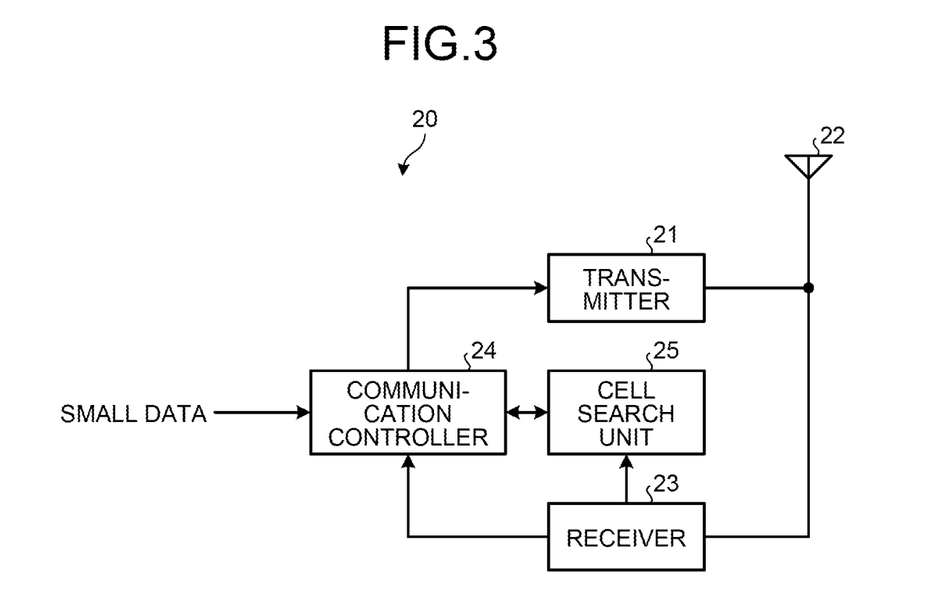
FIG. 3 is a block diagram illustrating one example of a terminal in the first embodiment.

FIG. 3 is a block diagram illustrating one example of the terminal in the first embodiment. In FIG. 3, a terminal 20 includes a transmitter 21, an antenna 22, a receiver 23, a communication controller 24, and a cell search unit 25. The terminal 20 is equivalent to the terminal U1 in FIG. 1.

The receiver 23 receives, via the antenna 22, cell notification information transmitted from the base station 10 (macro-cell base station N1) and outputs it to the cell search unit 25. When the terminal 20 is located within the small cell cluster CL1, the receiver 23 further receives, via the antenna 22, announcement information transmitted on a broadcast channel (BCH) and the like from each of the small-cell base stations N11 to N14. When the terminal 20 is located within the small cell cluster CL2, the receiver 23 further receives, via the antenna 22, the announcement information transmitted on the BCH and the like from each of the small-cell base stations N21 to N24. The receiver 23 outputs the received announcement information to the communication controller 24. The announcement information includes the cell identifiers of the respective small cells. For example, the announcement information transmitted from the small-cell base station N11 includes the cell identifier of the small cell C11.

The communication controller 24 extracts the cell identifiers included in the announcement information, and outputs the extracted cell identifiers to the cell search unit 25 as "peripheral cell information." That is, the "peripheral cell information" is the information indicative of the small cells present in the periphery of the terminal 20 (terminal U1).

The cell search unit 25 performs, in accordance with the cell notification information received from the receiver 23, a cell search targeting only the short-procedure-communication performable cells out of the small cells indicated in the peripheral cell information. For example, it is assumed that the small cells indicated in the peripheral cell information are the small cells C11 to C14, and that the small cells indicated as short-procedure-communication performable cells in the cell notification information are the small cells C12, C14, C22, and C24. In this case, the cell search unit 25 performs a cell search targeting only the small cells C12 and C14 out of the small cells C11 to C14. The cell search unit 25 then outputs the detection result of the cell search (that is, the cell search result) to the communication controller 24. It is assumed that the small cell C14 has been detected here through the cell search.

The communication controller 24 assigns small data to communication resources in accordance with the cell search result, and outputs the assignment result to the transmitter 21 together with the small data. For example, when the small cell C14 has been detected through the cell search performed by the cell search unit 25, the communication controller 24 assigns the small data to the communication resources of the small cell C14.

The transmitter 21 transmits the small data via the antenna 22 by using the communication resources in accordance with the assignment result. The transmitter 21 transmits the small data by using short-procedure communication. Consequently, when the small cell C14 has been detected through the cell search performed by the cell search unit 25, the transmitter 21 transmits the small data to the small-cell base station N14 that manages the small cell C14 by using short-procedure communication, for example.

Processing of Terminal

Figure 4:
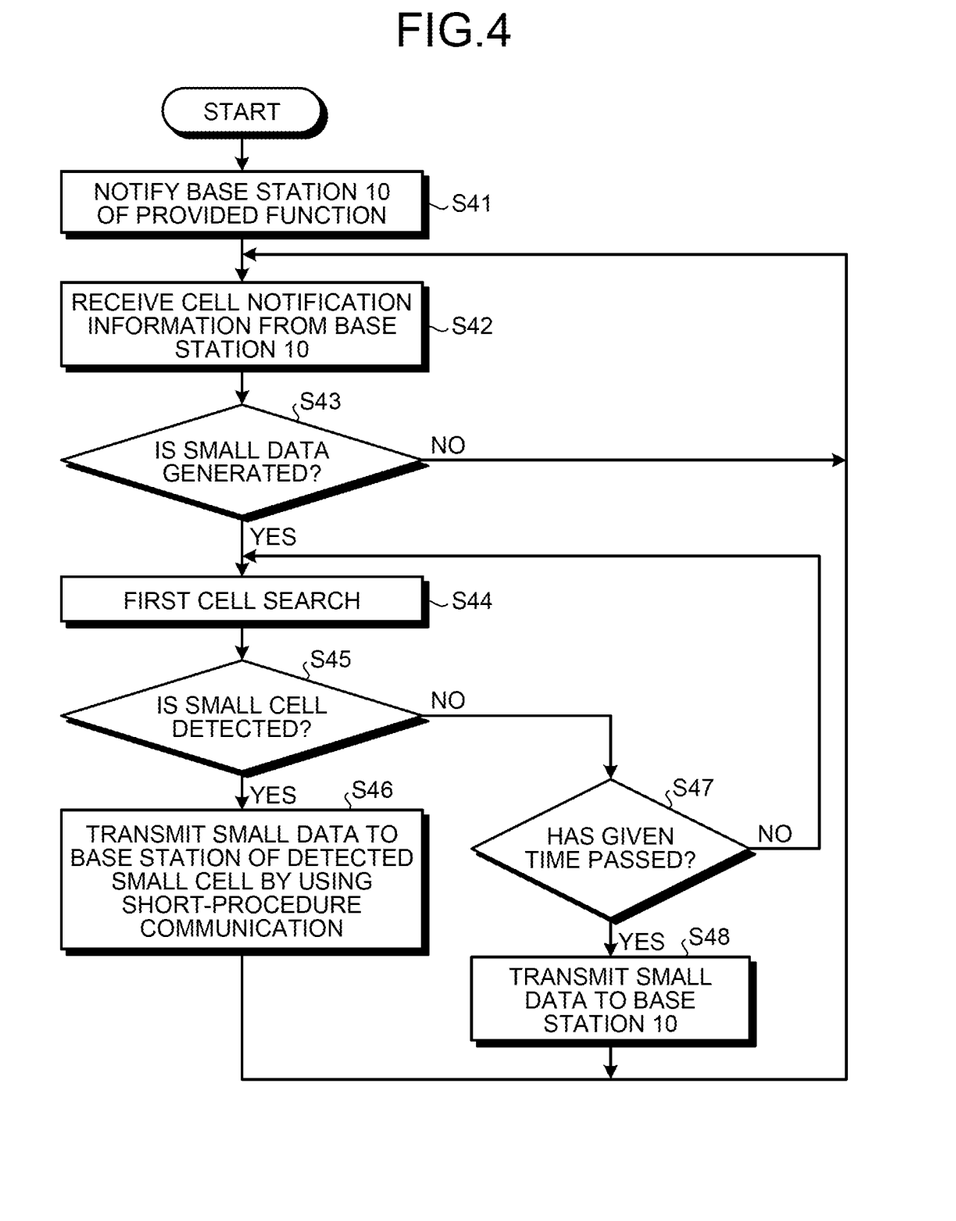
FIG. 4 is a flowchart for explaining the processing of the terminal in the first embodiment.

FIG. 4 is a flowchart for explaining the processing of the terminal in the first embodiment.

In the terminal 20 (terminal U1), the communication controller 24 notifies the base station 10 (macro-cell base station N1) of functions that the terminal 20 is provided with (Step S41). For example, the communication controller 24 forms "functional information" indicating that the terminal 20 is capable of performing short-procedure communication as the function of the terminal 20, and outputs it to the transmitter 21. The transmitter 21 transmits the functional information to the base station 10 via the antenna 22.

Then, the receiver 23 receives cell notification information from the base station 10 and receives any of announcement information transmitted from the small-cell base stations N11 to N14 and N21 to N24 (Step S42). From the announcement information, peripheral cell information is formed.

After that, if small data that ought to be transmitted is generated (Yes at Step S43), the communication controller 24 detects its occurrence and gives instructions of starting a cell search to the cell search unit 25. Furthermore, at the time the small data is generated, the communication controller 24 starts a timer that times a given time. In accordance with the starting instruction from the communication controller 24, the cell search unit 25 performs "first cell search" (Step S44). The "first cell search" is the cell search performed targeting only the short-procedure-communication performable cells out of the small cells indicated in the peripheral cell information. If the small data that ought to be transmitted is not generated (No at Step S43), the processing is returned to Step S42.

If a small cell is then detected by the first cell search (Yes at Step S45), the processing is advanced to Step S46. That is, the transmitter 21 transmits the small data to a small-cell base station that manages the small cell detected by the first cell search (that is, a short-procedure-communication performable cell), by using short-procedure communication (Step S46). Then, the processing is returned to Step S42.

If a small cell is not detected by the first cell search, that is, if a short-procedure-communication performable cell is not detected (No at Step S45), the processing is advanced to Step S47. That is, the communication controller 24 determines whether the timer has been terminated, that is, whether the given time has passed from the time the small data is generated (Step S47). If the given time has not passed (No at Step S47), the communication controller 24 continues the timing of the timer and the cell search unit 25 continues the first cell search (Step S44).

If the given time has passed, that is, if a short-procedure-communication performable cell is not detected within the given time from the time the small data is generated (Yes at Step S47), the processing is advanced to Step S48. That is, the communication controller 24 assigns the small data to the communication resources of the macro cell C1, and the transmitter 21 transmits the small data to the base station 10 (macro-cell base station N1) (Step S48). Then, the processing is returned to Step S42.

As in the foregoing, according to the first embodiment, the communication system 1 includes the macro cell C1 and the small cells C11 to C14 and C21 to C24. The macro-cell base station N1 manages the macro cell C1. In the macro-cell base station N1 (base station 10), the communication controller 13 outputs the notification information indicative of specific cells in which short-procedure communication is capable of being performed out of the small cells C11 to C14 and C21 to C24, that is, the cell notification information. The transmitter 15 transmits the cell notification information to the terminal U1 that is present in the macro cell C1.

Furthermore, in the terminal U1 (terminal 20), the receiver 23 receives the cell notification information from the macro-cell base station N1. The cell search unit 25 performs a cell search targeting only the short-procedure-communication performable cells out of the small cells C11 to C14 and C21 to C24 in accordance with the cell notification information.

Consequently, after narrowing down the target of cell search to the short-procedure-communication performable cells in the small cells C11 to C14 and C21 to C24, the cell search intended to detect the short-procedure-communication performable cells can be performed. Hence, the time it takes to detect the short-procedure-communication performable cells can be shortened, and as a result, the time until the start of short-procedure communication from the time the small data is generated can be shortened. Consequently, according to the first embodiment, the short-procedure communication can be performed efficiently in a cell configuration in which cells of different sizes are mixed.

Furthermore, in the terminal U1 (terminal 20), when a small cell of short-procedure-communication performable cell is detected through the cell search performed by the cell search unit 25, the transmitter 21 transmits small data to the small-cell base station that manages the detected small cell by using short-procedure communication.

Because the transmission power can be reduced by transmitting small data to a small-cell base station, the power consumption of the terminal U1 can be reduced. Moreover, by transmitting the small data by using short-procedure communication, the power consumption of the terminal U1 can further be reduced.

In the terminal U1 (terminal 20), when a small cell of short-procedure-communication performable cell is not detected through the cell search performed by the cell search unit 25 within the given time from the time the small data is generated, the transmitter 21 transmits the small data to the macro-cell base station N1.

Consequently, even when it is difficult to detect a short-procedure-communication performable cell, the small data can be transmitted to a higher-level device on a network side via the macro-cell base station N1. That is, the macro-cell base station N1 can be used as a backup of a small-cell base station capable of performing short-procedure communication.

Furthermore, in the terminal U1 (terminal 20), the transmitter 21 transmits the functional information indicating that the terminal U1 is capable of performing short-procedure communication to the macro-cell base station N1.

Consequently, the macro-cell base station N1 is able to transmit the cell notification information only to the terminals that have the function of short-procedure communication, out of a number of terminals present in the macro cell C1. Thus, in the macro-cell base station N1, a wasteful transmission of the cell notification information to the terminals that do not have the function of short-procedure communication can be omitted.

Second Embodiment

Processing of Terminal

Figure 5:
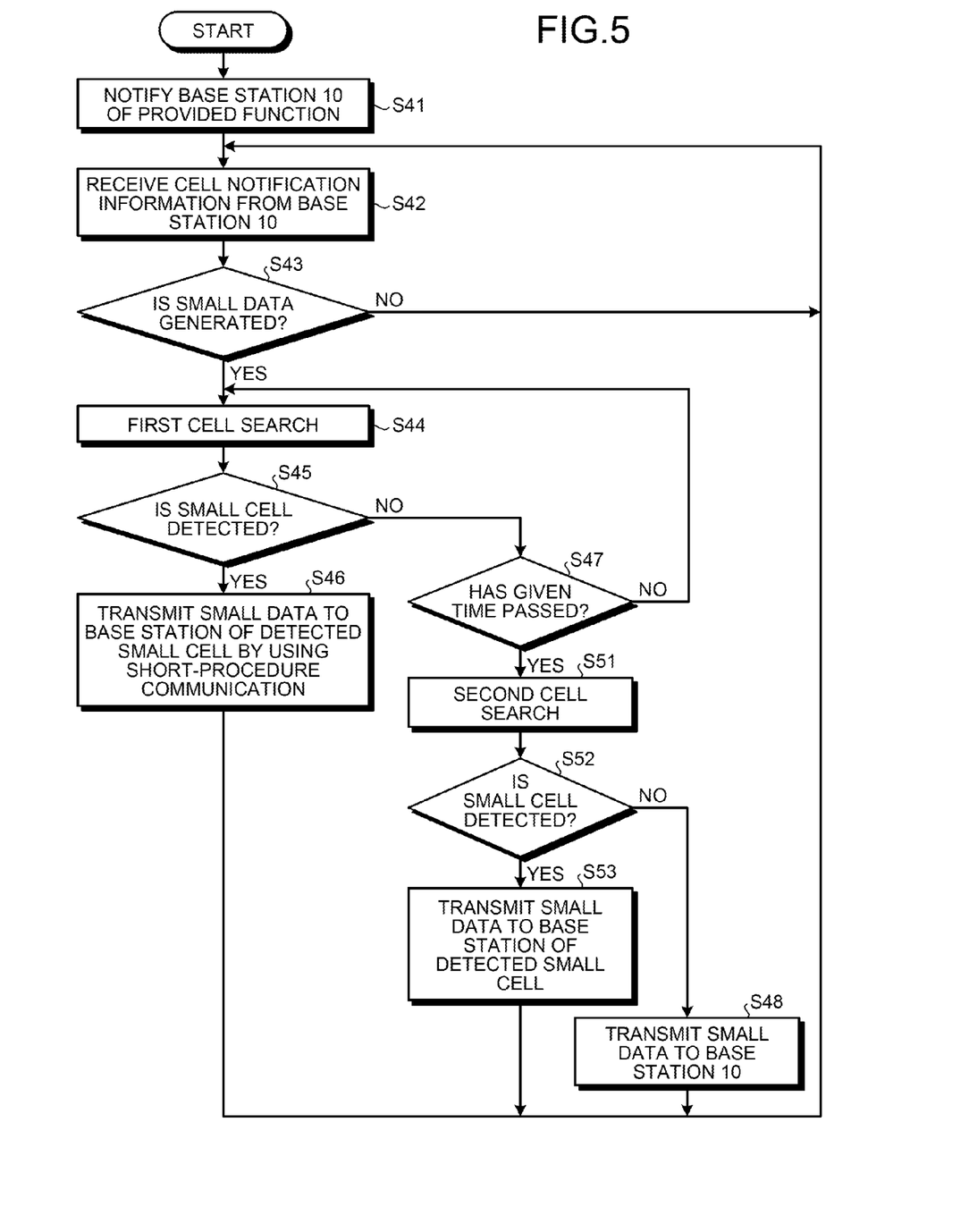
FIG. 5 is a flowchart for explaining the processing of a terminal according to a second embodiment.

FIG. 5 is a flowchart for explaining the processing of a terminal according to a second embodiment. Note that the processing between Step S41 and Step S48 is the same as that in FIG. 4, and thus its explanation is omitted.

At Step S47, if it is determined that the given time has passed, that is, if a short-procedure-communication performable cell is not detected within the given time from the time the small data is generated (Yes at Step S47), the processing is advanced to Step S51. That is, the communication controller 24 notifies the cell search unit 25 that the given time has passed. The cell search unit 25, in accordance with that notification, performs "second cell search" (Step S51). The "second cell search" is the cell search performed targeting the small cells other than the short-procedure-communication performable cells. For example, when the small cells C12 and C14 are of short-procedure-communication performable cells out of the small cells C11 to C14, the second cell search is performed targeting the small cells C11 and C13 while the first cell search is performed targeting the small cells C12 and C14.

If a small cell is then detected by the second cell search (Yes at Step S52), the processing advanced to Step S53. That is, the communication controller 24 forms a service request and outputs it to the transmitter 21 together with the cell search result, and the transmitter 21 transmits the service request to the small-cell base station that manages the small cell detected by the second cell search. Consequently, a DRB is newly set up between the terminal 20 and the small-cell base station that manages the small cell detected by the second cell search. The transmitter 21 then transmits the small data to the small-cell base station that manages the small cell detected by the second cell search, by using the DRB (Step S53). Then, the processing is returned to Step S42.

If a small cell is not detected even by the second cell search, that is, if any of the small cells including short-procedure-communication performable cells is not detected (No at Step S45 and No at Step S52), the processing is advanced to Step S48.

As in the foregoing, according to the second embodiment, in the terminal U1 (terminal 20), when a small cell that is of short-procedure-communication performable cell is not detected within the given time from the time the small data is generated, the cell search unit 25 performs a cell search targeting the small cells other than the short-procedure-communication performable cells.

Consequently, even when it is difficult to detect a short-procedure-communication performable cell, by performing the second cell search in a complementary manner, the small data can be transmitted to a higher-level device on a network side via a small-cell base station that manages a small cell other than the short-procedure-communication performable cells. That is, a small-cell base station not capable of performing the short-procedure communication can be used as a backup of a small-cell base station of short-procedure-communication performable cell.

Other Embodiments

1. The cell notification information may include a part of announcement information in a short-procedure-communication performable cell, information indicative of the transmission timing of a synchronization signal in the short-procedure-communication performable cell, or information indicative of the timing in the short-procedure-communication performable cell at which the terminal U1 is allowed to transmit a random access signal. One or more types of the foregoing information may be included in the cell notification information. By including in the cell notification information a part of the announcement information in the short-procedure-communication performable cell, or the information indicative of the transmission timing of the synchronization signal in the short-procedure-communication performable cell, the time it takes to detect short-procedure-communication performable cells in the first cell search can further be shortened. By including in the cell notification information the information indicative of the timing in the short-procedure-communication performable cell at which the terminal U1 is allowed to transmit a random access signal, the time it takes to execute a random access procedure can be shortened.

2. The base station 10 and the terminal 20 do not necessarily need to be physically configured as illustrated in the drawings. That is, the specific embodiments of distribution or integration of the various units are not limited to those illustrated, and the whole or a part thereof can be configured by being functionally or physically distributed or integrated in any unit according to various types of loads and usage.

Moreover, the various processing functions that are performed by the base station 10 and the terminal 20 may be configured such that a central processing unit (CPU) (or a microcomputer such as a micro processing unit (MPU) and a micro controller unit (MCU)) executes the whole or a part thereof. The various processing functions may be configured such that the whole or any part thereof is executed on a program, which is analyzed and executed by the CPU (or a microcomputer such as an MPU and an MCU), or on hardware by wired logic.

3. The base station 10 and the terminal 20 can be implemented by the following hardware configuration, for example.

Figure 6:
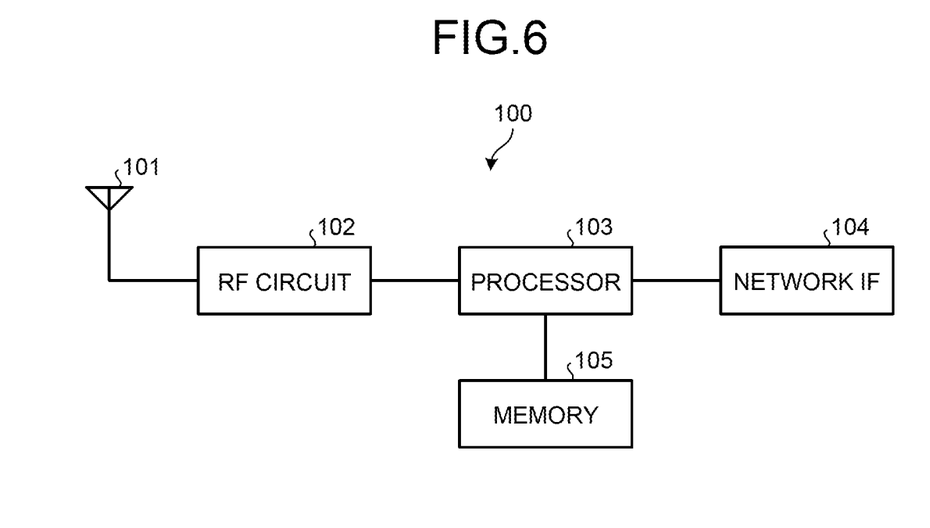
FIG. 6 is a block diagram illustrating an example of the hardware configuration of a base station.

FIG. 6 is a block diagram illustrating an example of the hardware configuration of a base station. As illustrated in FIG. 6, a base station 100 includes an antenna 101, a radio frequency (RF) circuit 102, a processor 103, a network IF 104, and a memory 105. As one example of the processor 103, included are a CPU, a digital signal processor (DSP), and a field programmable gate array (FPGA). As one example of the memory 105, included are a random access memory (RAM) such as a synchronous dynamic random access memory (SDRAM), a read only memory (ROM), and a flash memory.

The various processing functions performed in the base station 10 may be implemented by the processor 103 executing programs stored in various memories such as a non-volatile storage medium. That is, the programs corresponding to the respective processing that is performed by the receiver 12, the communication controller 13, and the transmitter 15 may be stored in the memory 105, and the respective programs may be executed by the processor 103. Furthermore, the receiver 12 and the transmitter 15 are implemented by the RF circuit 102 and the processor 103. The communication controller 13 is implemented by the processor 103. The storage unit 16 is implemented by the memory 105. The antenna 11 is implemented by the antenna 101. The network IF 14 is implemented by the network IF 104.

Figure 7:
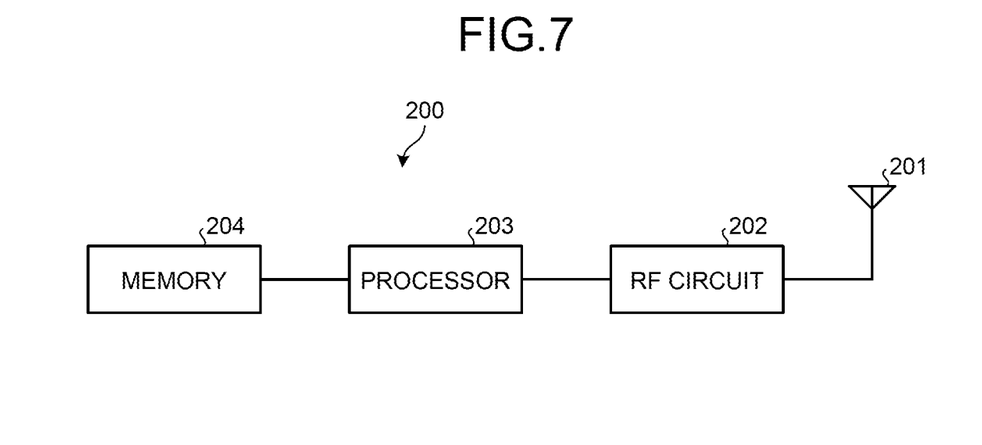
FIG. 7 is a block diagram illustrating an example of the hardware configuration of a terminal.

FIG. 7 is a block diagram illustrating an example of the hardware configuration of a terminal. As illustrated in FIG. 7, a terminal 200 includes an antenna 201, an RF circuit 202, a processor 203, and a memory 204. As one example of the processor 203, included are a CPU, a DSP, and an FPGA. As one example of the memory 204, included are a RAM such as an SDRAM, a ROM, and a flash memory.

The various processing functions performed in the terminal 20 may be implemented by the processor 203 executing programs stored in various memories such as a non-volatile storage medium. That is, the programs corresponding to the respective processing performed by the transmitter 21, the receiver 23, the communication controller 24, and the cell search unit 25 may be stored in the memory 204, and the respective programs may be executed by the processor 203. The transmitter 21 and the receiver 23 are implemented by the RF circuit 202 and the processor 203. The communication controller 24 is implemented by the processor 203. The antenna 22 is implemented by the antenna 201.

4. The disclosed technology is also applicable to user data other than the small data.

According to one aspect of the disclosed embodiment, the short-procedure communication can be performed efficiently in a cell configuration in which cells of different sizes are mixed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication system comprising:
    a first cell;
    a plurality of second cells having range areas smaller than a range area of the first cell;
    a first base station that manages the first cell; and
    a terminal device that is present in the first cell, wherein
    the first base station transmits notification information to the terminal device, the second cells including a specific cell in which short-procedure communication is capable of being performed and a cell in which the short-procedure communication is not capable of being performed, the short-procedure communication being communication of transmitting or receiving user data without newly setting up a communication channel for exclusive use of the user data at the time the user data is generated, the notification information indicating that which cell is the specific cell in which the short-procedure communication is capable of being performed and which cell is the cell in which the short-procedure communication is not capable of being performed out of the second cells, and
    the terminal device performs a cell search targeting the specific cell out of the second cells in accordance with the notification information.

2. A base station that manages a first cell in a communication system including the first cell and a plurality of second cells having range areas smaller than a range area of the first cell, the base station comprising:
    a controller that outputs notification information, the second cells including a specific cell in which short-procedure communication is capable of being performed and a cell in which the short-procedure communication is not capable of being performed, the short-procedure communication being communication of transmitting or receiving user data without newly setting up a communication channel for exclusive use of the user data at the time the user data is generated, the notification information indicating that which cell is the specific cell in which the short-procedure communication is capable of being performed and which cell is the cell in which the short-procedure communication is not capable of being performed out of the second cells; and
    a transmitter that transmits the notification information to a terminal device that is present in the first cell.

3. The base station according to claim 2, wherein the notification information includes at least one of a part of announcement information in the specific cell, information indicative of transmission timing of a synchronization signal in the specific cell, and information indicative of timing at which the terminal device is allowed to transmit a random access signal in the specific cell.

4. A terminal device used in a communication system including a first cell and a plurality of second cells having range areas smaller than a range area of the first cell, the terminal device comprising:
    a receiver that receives notification information from a first base station that manages the first cell, the second cells including a specific cell in which short-procedure communication is capable of being performed and a cell in which the short-procedure communication is not capable of being performed, the short-procedure communication being communication of transmitting or receiving user data without newly setting up a communication channel for exclusive use of the user data at the time the user data is generated, the notification information indicating that which cell is the specific cell in which the short-procedure communication is capable of being performed and which cell is the cell in which the short-procedure communication is not capable of being performed out of the second cells; and
    a search unit that performs a cell search targeting the specific cell out of the second cells in accordance with the notification information.

5. The terminal device according to claim 4, further comprising a transmitter that, when the specific cell is detected through the cell search performed by the search unit, transmits user data to a second base station that manages the detected specific cell by using the short-procedure communication.

6. The terminal device according to claim 5, wherein the transmitter transmits the user data to the first base station when the specific cell is not detected through the cell search performed by the search unit within a given time from a point of time the user data is generated.

7. The terminal device according to claim 5, wherein the transmitter transmits, to the first base station, information indicating that the terminal device is capable of performing the short-procedure communication.

8. The terminal device according to claim 5, wherein the search unit performs the cell search targeting the second cells other than the specific cell when the specific cell is not detected through the cell search within a given time from a point of time the user data is generated.

9. A communication method in a communication system including a first cell, a plurality of second cells having range areas smaller than a range area of the first cell, a first base station that manages the first cell, and a terminal device that is present in the first cell, the communication method comprising:
    transmitting, by the first base station, notification information to the terminal device, the second cells including a specific cell in which short-procedure communication is capable of being performed and a cell in which the short-procedure communication is not capable of being performed, the short-procedure communication being communication of transmitting or receiving user data without newly setting up a communication channel for exclusive use of the user data at the time the user data is generated, the notification information indicating that which cell is the specific cell in which the short-procedure communication is capable of being performed and which cell is the cell in which the short-procedure communication is not capable of being performed out of the second cells; and
    performing, by the terminal device, a cell search targeting the specific cell out of the second cells in accordance with the notification information.

* * * * *